(12) United States Patent
Zhao et al.

(10) Patent No.: US 9,454,438 B2
(45) Date of Patent: Sep. 27, 2016

(54) RECOVERY CIRCUIT FOR BASIC INPUT-OUTPUT SYSTEM

(71) Applicant: ShenZhen Treasure City Technology Co., LTD., ShenZhen (CN)

(72) Inventors: Long Zhao, Wuhan (CN); Yi-Hung Peng, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 71 days.

(21) Appl. No.: 14/567,012

(22) Filed: Dec. 11, 2014

(65) Prior Publication Data
US 2015/0309903 A1 Oct. 29, 2015

(30) Foreign Application Priority Data
Apr. 29, 2014 (CN) .......................... 2014 1 0175086

(51) Int. Cl.
*G06F 11/00* (2006.01)
*G06F 11/14* (2006.01)
*G06F 11/22* (2006.01)

(52) U.S. Cl.
CPC ........ *G06F 11/1417* (2013.01); *G06F 11/2284* (2013.01)

(58) Field of Classification Search
CPC .................... G06F 11/2284; G06F 11/1417
See application file for complete search history.

(56) References Cited

U.S. PATENT DOCUMENTS

| | | | | |
|---|---|---|---|---|
| 5,835,695 | A * | 11/1998 | Noll ..................... | G06F 11/1417 714/11 |
| 2005/0081090 | A1* | 4/2005 | Lin ....................... | G06F 11/1417 714/6.11 |
| 2009/0158025 | A1* | 6/2009 | Hung ................... | G06F 11/1666 713/2 |
| 2011/0093741 | A1* | 4/2011 | Liang .................. | G06F 11/1417 714/6.1 |
| 2011/0119474 | A1* | 5/2011 | Singh ................... | G06F 8/65 713/2 |
| 2012/0079260 | A1* | 3/2012 | Yin ...................... | G06F 11/1417 713/2 |
| 2012/0110379 | A1* | 5/2012 | Shao ................... | G06F 11/1417 714/15 |
| 2013/0138940 | A1* | 5/2013 | Wang ................... | G06F 11/1417 713/2 |
| 2013/0173833 | A1* | 7/2013 | Zou ...................... | G06F 13/4022 710/301 |
| 2013/0305027 | A1* | 11/2013 | Jiang ................... | G06F 9/4401 713/2 |
| 2015/0074385 | A1* | 3/2015 | Zheng .................. | G06F 8/665 713/2 |
| 2015/0143172 | A1* | 5/2015 | Huang ................ | G06F 11/1435 714/15 |
| 2015/0149815 | A1* | 5/2015 | Maity ................ | G06F 11/1435 714/5.11 |

\* cited by examiner

*Primary Examiner* — Yolanda L Wilson
(74) *Attorney, Agent, or Firm* — Zhigang Ma

(57) ABSTRACT

A recovery circuit for a basic input-output system (BIOS) of a computer includes a storage, a platform controller hub (PCH), and a processor. An effective chip select signal is received by a chip selection pin of the storage via a second pin of the processor when a first pin of the processor does not receive any signals, data in the processor is transmitted to the PCH to make the computer boot up, the data in the processor is transmitted to the storage to erase and update data in the storage.

2 Claims, 1 Drawing Sheet

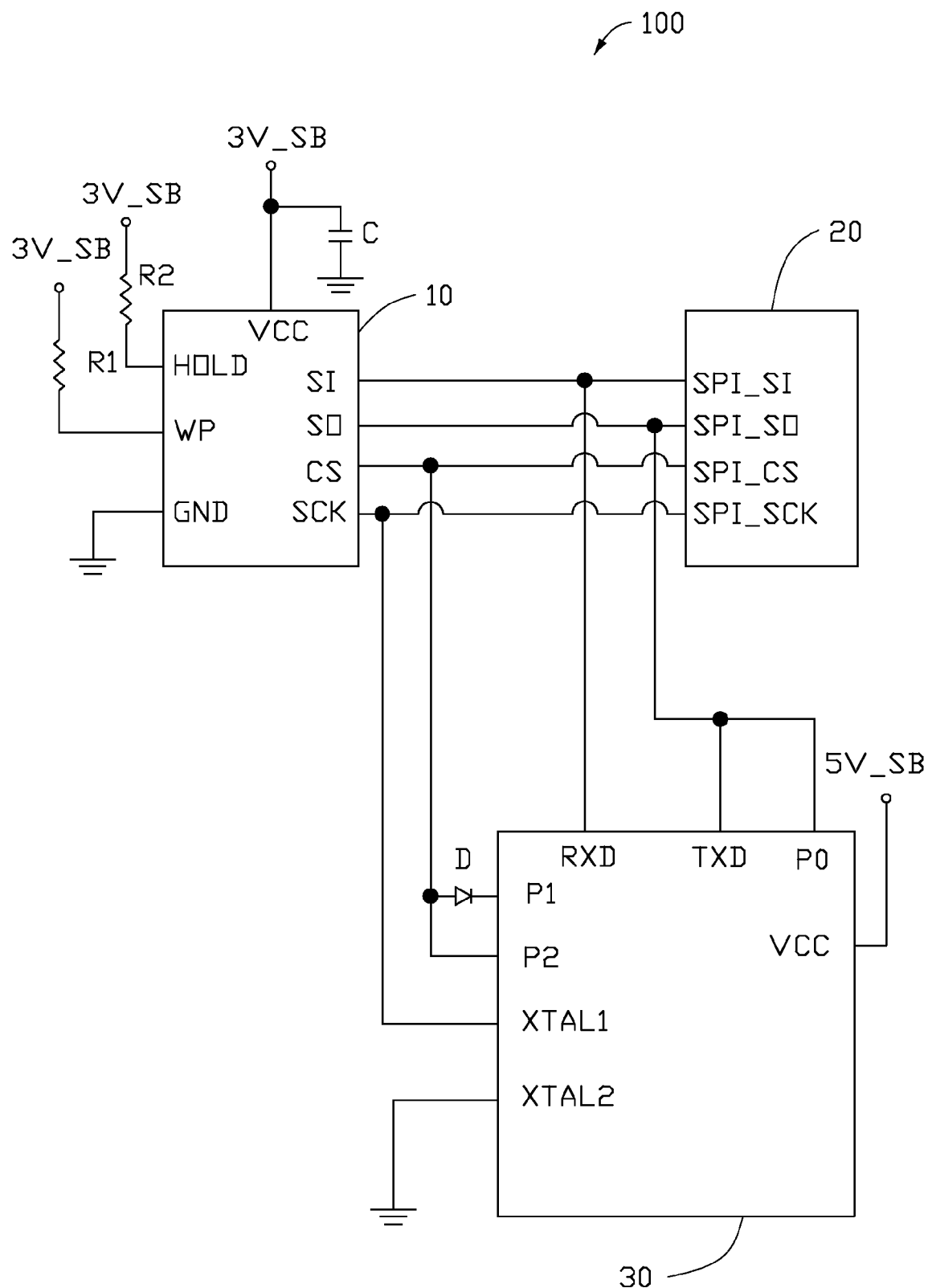

RECOVERY CIRCUIT FOR BASIC INPUT-OUTPUT SYSTEM

FIELD

The subject matter herein generally relates to a recovery circuit for basic input-output system (BIOS).

BACKGROUND

A computer cannot boot up when data in BIOS is damaged.

BRIEF DESCRIPTION OF THE DRAWINGS

Implementations of the present technology will now be described, by way of example only, with reference to the attached FIGURE.

The FIGURE is a circuit diagram of an embodiment of a recovery circuit for a basic input-output system.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a recovery circuit for a basic input-output system (BIOS).

The FIGURE illustrates a recovery circuit 100 for a basic input-output system of a computer. The recovery circuit 100 can comprise a storage 10 of the BIOS, a platform controller hub (PCH) 20, and a processor 30.

The storage 10 of the BIOS is configured to store BIOS setup program, system setup, power on self test program, and system boot program. The storage 10 can comprise a chip selection pin CS, an output pin SO, an input pin SI, a clock pin SCK, a write protection pin WP, a hold pin HOLD, a power supply pin VCC, and a ground pin GND. The power supply pin VCC is coupled to a power supply 3V_SB. The power supply pin VCC is also coupled to ground through a capacitor C. The write protection pin WP is coupled to the power supply 3V_SB through a first resistor R1. The hold pin HOLD is coupled to the power supply 3V_SB through a second resistor R2. The ground pin GND is coupled to ground.

The PCH 20 is a chip and exchange information with peripherals in a manner that serial peripheral interface (SPI) buses are connected to the peripherals in series. In at least one embodiment, the SPI buses can comprise a chip select signal bus SPI_CS, an input data bus SPI_SO, an output data bus SPI_SI, and a serial clock bus SPI_SCK. The chip select signal bus SPI_CS is coupled to the chip selection pin CS of the storage 10. The input data bus SPI_SO is coupled to the output pin SO of the storage 10. The output data bus SPI_SI is coupled to the input pin SI of the storage 10. The serial clock bus SPI_SCK is coupled to the clock pin SCK of the storage 10.

The processor 30 can comprise a serial input pin RXD, a serial output pin TXD, first to third pins P0, P1, P2, first and second clock pins XTAL1, XTAL2, and a power pin VCC. The power pin VCC is coupled to a standby power supply 5V_SB. The first clock pin XTAL1 is coupled to the clock pin SCK of the storage 10. The second clock pin XTAL2 is coupled to ground. The second pin P1 is coupled to a cathode of a diode D. An anode of the diode D is coupled to the chip selection pin CS of the storage 10. The third pin P2 is coupled to the chip selection pin CS of the storage 10. The serial input pin RXD is coupled to the input pin SI of the storage 10. The serial output pin TXD is coupled to the output pin SO of the storage 10. The first pin P0 is coupled to the serial output pin TXD.

The BIOS setup program, the system setup, the power on self test program, and the system boot program stored in the BIOS 10 are complete at the first use, a chip select signal in the PCH 20 is transmitted to the chip selection pin CS of the storage 10 via the chip select signal bus SPI_CS, a clock signal in the PCH 20 is transmitted to the clock pin SCK of the storage 10 via the serial clock bus SPI_SCK, data in the output pin SO is transmitted to the PCH 20 via the input data bus SPI_SO, and data in the input pin SI is transmitted to the PCH 20 via the input data bus SPI_SI, thereby the PCH 20 capturing the BIOS setup program, the system setup, the power on self test program, and the system boot program stored in the storage 10 make the computer boot up. Simultaneously, the data in the output pin SO is transmitted to the processor 30 via the serial output pin TXD, and the data in the input pin SI is transmitted to the processor 30 via the serial input pin RXD, thereby the processor 30 stores the BIOS setup program, the system setup, the power on self test program, and the system boot program stored in the storage 10.

The PCH 20 captures BIOS setup program, the system setup, the power on self test program, and the system boot program stored in the storage 10, and makes the computer boot up, when the BIOS setup program, the system setup, the power on self test program, and the system boot program stored in the storage 10 is normal.

When the computer reboots, the output pin SO of the storage 10 outputs a booting signal, and the first pin P0 of the processor 30 receives a high level signal. There is no data of the serial input pin RXD and the serial output pin TXD to transmit.

When the BIOS setup program, the system setup, the power on self test program, and the system boot program stored in the storage 10 is wrong, the PCH 20 cannot capture the right BIOS setup program, the right system setup, the right power on self test program, and the right system boot program stored in the storage 10, and the server system 100 cannot startup. In this situation, the first pin P0 of the processor 30 cannot receive signals. An effective chip select signal is received by the chip selection pin CS of the storage 10 via the second pin P1 of the processor 30. The data in the serial output pin TXD of the processor 30 is transmitted to the PCH 20 via the input data bus SPI_SO, and data in the serial input pin RXD of the processor 30 is transmitted to the PCH 20 via the input data bus SPI_SI, thereby the PCH 20 capturing the BIOS setup program, the system setup, the power on self test program, and the system boot program stored in the processor 30 and making the computer boot up. Simultaneously, the data in the serial output pin TXD of the processor 30 is transmitted to the storage 10 via the output pin SO, and data in the serial input pin RXD of the processor 30 is transmitted to the storage 10 via the input pin SI, the wrong data of the BIOS setup program, the system setup, the power on self test program, and the system boot program stored in the storage 10 is erased and updated by the processor 30.

The embodiment shown and described above is only example. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A recovery circuit for a basic input-output system (BIOS) of a computer, the recovery circuit comprising:
   a storage unit comprising a chip selection pin, an output pin, an input pin, and a clock pin;
   a platform controller hub (PCH), wherein the PCH is a chip configured to exchange information with peripherals in a manner that serial peripheral interface buses are connected to the storage unit; wherein the SPI buses comprise a chip select signal bus coupled to the chip selection pin of the storage unit, an input data bus coupled to the output pin of the storage unit, an output data bus coupled to the input pin of the storage unit, and a serial clock bus coupled to the clock pin of the storage unit; and
   a processor comprising a serial input pin, a serial output pin, a first pin, a second pin, a third pin, a first clock pin, and a second clock pin, and a power pin; wherein the power pin is coupled to a standby power supply, the first clock pin is coupled to the clock pin of the storage unit, the second clock pin is coupled to ground, the second pin is coupled to a cathode of a diode, an anode of the diode is coupled to the chip selection pin of the storage unit, the third pin is coupled to the chip selection pin of the storage unit, the serial input pin is coupled to the input pin of the storage unit, the serial output pin is coupled to the output pin of the storage unit, and the first pin is coupled to the serial output pin;
   wherein if an effective chip select signal is received by the chip selection pin of the storage unit via the second pin of the processor when the first pin of the processor does not receive any signals, data in the processor is transmitted to the PCH to make the computer boot up, and the data in the processor is transmitted to the storage unit to erase and update data in the storage unit.

2. The recovery circuit of claim 1, wherein the storage unit further comprises a write protection pin, a hold pin, a power supply pin, and a ground pin, the power supply pin is coupled to a power supply, the power supply pin is also coupled to ground through a capacitor, the write protection pin is coupled to the power supply through a first resistor, the hold pin is coupled to the power supply through a second resistor, the ground pin is coupled to ground.

* * * * *